Dec. 6, 1927.

J. A. SHIVELY 1,651,735

MACHINE FOR GUM STRIPPING BEADS

Filed March 16, 1926     2 Sheets-Sheet 1

Inventor
Jess A. Shively.

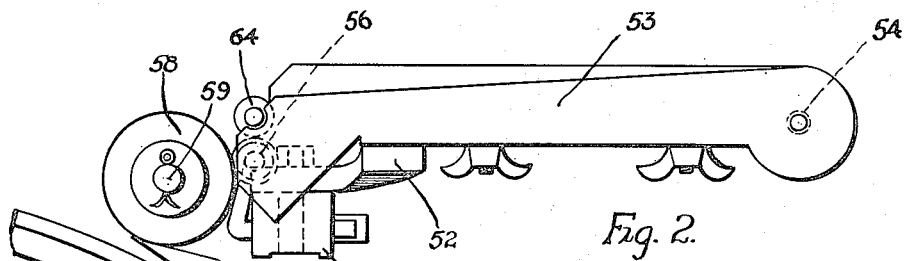
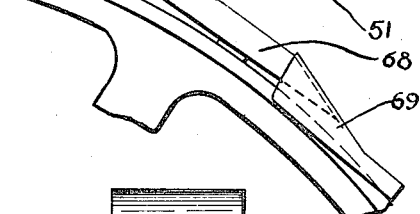
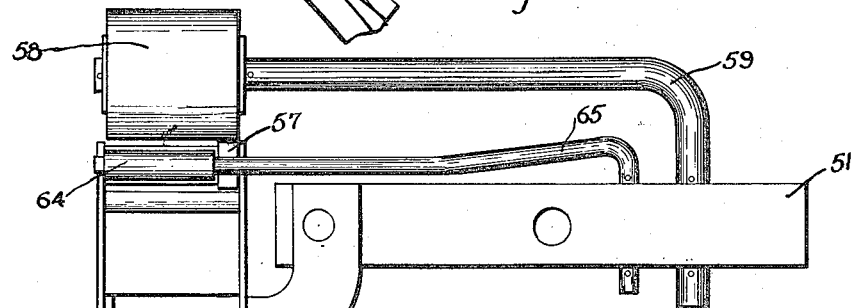
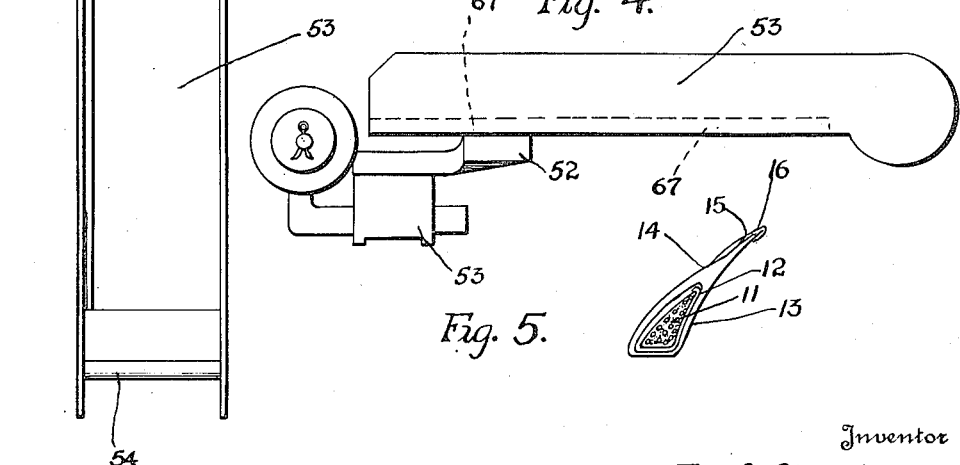

Patented Dec. 6, 1927.

1,651,735

UNITED STATES PATENT OFFICE.

JESS A. SHIVELY, OF AKRON, OHIO, ASSIGNOR TO THE GOODYEAR TIRE & RUBBER COMPANY, OF AKRON, OHIO, A CORPORATION OF OHIO.

MACHINE FOR GUM-STRIPPING BEADS.

Application filed March 16, 1926. Serial No. 95,045.

My invention relates to a machine for manufacturing beads and it has particular relation to a machine for applying a strip of unvulcanized rubber to the skirt of a bead.

One object of my invention is to provide a machine which will overcome the expensive manual operations that have characterized the methods employed heretofore, of applying rubber tissue to beads.

Another object of my invention is to provide a machine which will produce a uniform product more quickly than has previously been possible.

In its essentials a pneumatic tire embodies superposed layers of rubberized fabric, which, when vulcanized, constitute a unitary body. Whether the reinforcing material be cord or cross-woven fabric, beads of some suitable construction are employed to insure a secure mounting of the tire upon a rim. The bead consists of a fabric covered ring which may or may not be extensible, depending upon the type of rim that is to be employed therewith. It is customary however, to wrap the bead with a fabric material known as a flipper. This serves primarily, to anchor it to the side walls of the tire. Obviously the anchorage is subjected to excessive stresses during its life and it is of paramount importance therefore that the union be most tenacious. To this end a strip of unvulcanized rubber is applied about the edge of the skirt of the flipper to provide additional adhesive material and thereby insure a serviceable bond in the vulcanized product.

Heretofore, it has been customary to perform the gum-stripping operation manually by applying a band of rubber to the skirt. The operation was slow and tedious. Moreover, inasmuch as the rubber strip is seldom more than three-quarters of an inch wide, the product was marked for its lack of uniformity, which resulted in a poor union on one or the other side of the anchored skirt.

I have discovered that when one edge of a strip of rubber is applied to the edge of an arcuate surface that is subsequently caused to increase its apparent diameter, the free edge of the strip of rubber tends to relieve the force applied thereto and reduce the strain to which it is subjected, by curling about the edge of the lengthened surface. In constructing my machine use has been made of this phenomenon.

The preferred embodiment of the principles of my invention includes a drum whereon a bead may be clamped and subsequently rotated. Near the free end of the flipper of the bead a guide member is so positioned as to supply a strip of the unvulcanized tissue in exact alignment to secure a correct margin. After the strip is stitched to one side of the fabric material, the latter is inclined, by suitably positioned roller members, to increase its apparent diameter. The resultant strain which the vulcanizable material undergoes effects a curling about the edge of the fabric where it is subsequently stitched and thereafter held permanently in position. It is advisable, in order to aid the curling action, to subject the strip to a preliminary tension before stitching it to the bead. Under most circumstances better results are uniformly obtained by this additional step. The operations are continuous and by rotating the bead, it is possible that they be performed simultaneously. Moreover, the device has been designed to afford ease and rapidity of manipulation.

A better understanding of my invention may be had by referring to the drawings in which:

Fig. 2 is a side elevational view, on an enlarged scale, of the guide and stitching elements, together with the means for subjecting the rubber strip to a preliminary tension before applying it to the skirt of the bear;

Fig. 3 is a plan view of the elements illustrated in Fig. 2;

Fig. 4 is a side elevational view of a modification of the elements illustrated in Fig. 2, wherein the preliminary tension is created by frictional contact, and;

Fig. 5 is a cross-sectional view of a flipped bead to which a rubber strip has been applied.

Figure 1:
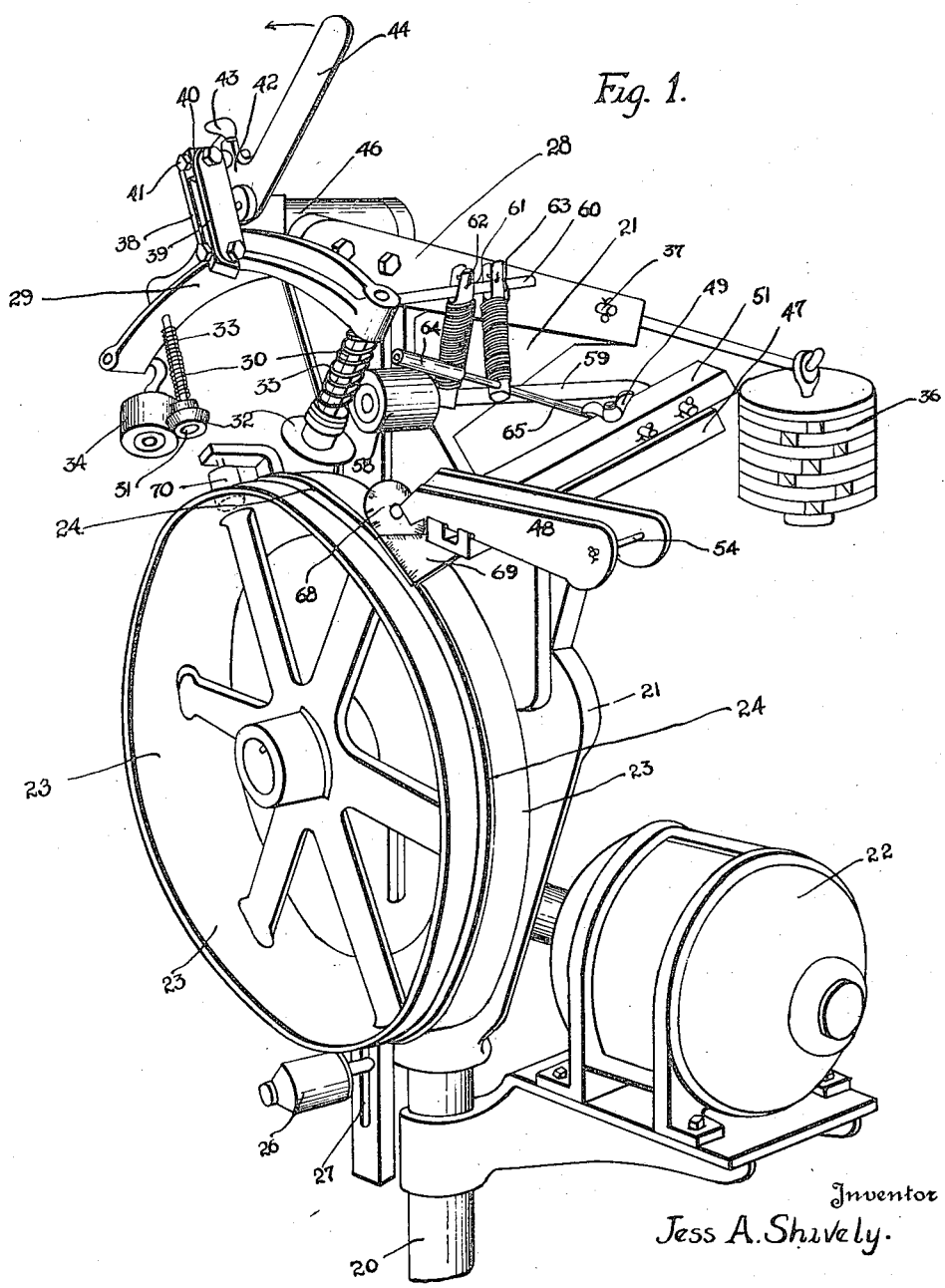
Fig. 1 is a perspective view of a device embodying the principles thereof in readiness to receive a bead.

A bead includes a ring portion 11 that may consist wholly of an elastic material, such as rubber, or may include an inelastic material, such as wire, that has previously been insulated with unvulcanized hard rubber composition. The product so formed is enclosed in a strip of rubberized fabric 12 known as the wrap. Frequently, in this condition, it is vulcanized or given what is commonly known as a set cure, after which a flipper strip 13 is applied thereto. The number of these strips is optional though dependent somewhat upon the size of the tire in which the bead is to be incorporated. For the small size passenger car tires, it is customary to employ but a single flipper.

The upper portion of a product so formed, indicated by numeral 14, is commonly designated as the skirt of the bead. It should be noted that the edges of the flipper strip are stitched in staggered relation to form what is known as a step-off or margin 15. In applying a rubber strip 16, according to my preferred embodiment, it is stitched to overlap the side of the skirt which exposes the staggered relationship after which the free edge of the rubber is permitted to curl about the outer edge of the skirt where it is stitched in its final position.

A machine constructed to effect these operations embodies a suitable base 20 which supports a frame 21. A motor 22 is connected through a speed reducing mechanism (not shown) to a drum 23 that is rotatably supported in the frame 21. The outer periphery of this drum is provided with a flange 24 against which a bead is positioned.

Because of their flexibility, it is advisable when applying rubber strips to extensible beads, to tension the same by causing them to encircle a small idler pulley 26 which is adjustably supported in a slotter bar member 27 that is made fast to the frame. Near the top of the frame is pivoted a T-shaped clamping device 28 having a cross-arm 29 of arcuate contour from which are suspended two elongate pins 30. Each pin has a shouldered portion 31 at its lower extremity which supports a rotatable bevel edged bead guiding disc 32 that is held resiliently against the shouldered portion of the pin by a spring 33. In addition to the beveled discs, there is suspended from the arm a rotatable roll member 34 whose body portion is constructed, preferably, of a vulcanizable material, which is protected by a suitable fabric medium. Normally, these elements are maintained in a raised position by a counter-weight 36 which is adjoined to the clamping member on the opposite side of its pivotal point 37.

Two links 38 and 39 are pivotally connected at one of their ends to the arcuate arm 29 and at the other to a bearing block 40 which is pivotally supported on a pin 41 that is secured to an arm 42. This arm, which includes a lug portion 43 made integral therewith, along with arm 44, constitutes a bell crank which is secured at its fulcrum to a stud shaft. The shaft pivots in a bossed portion 46 of the frame.

To clamp a bead in position, the arm 44 is moved in the direction indicated by the arrow. After the elements which are supported by the arcuate member have engaged the beads and have passed their lowermost position, the lug 43 engages the link 38, thereby preventing further pivotal movement. It will be noted that after the arm has passed its lowermost position, it will not of itself move in the reverse direction and is therefore, in a sense locked. To remove a bead which is clamped, force must be applied to the arm 44 in a direction opposite to that defined by the arrow, in order that the elements may be moved past their lowermost point, after which the counter-weight 36 will raise the arm automatically.

Integral with the frame is a grooved arm 47 in which a guide device, indicated generally by 48, is held securely but in adjustable relation by a set screw 49. Two embodiments of the guide device are illustrated, both of which include a slidable bar 51 which is joined by an L-shaped member 52 to a metallic channel or chute 53 through which a strip of rubber is made to pass. According to the modifications illustrated in Figs. 2 and 3, the channel is fitted at both ends with rotatable cylindrical members 54 and 56, over which the rubber strip passes. The cylindrical member 56, mounted in the discharge end of the channel has a shouldered portion 57 that engages a second roll 58 which is surfaced preferably with a vulcanized material suitably reinforced by a fabric material to keep the gum strip from sticking to it. It rotates about a rod 59, that is pivoted in the bar member, and is raised and lowered simultaneously with the clamping arm 28 by means of a short rod 60, which extends from the arcuate arm of the T-shaped clamping device, through the sides of a bifurcated pin 61. The bifurcated pin is joined rigidly at its lower extremity to the arm 59, which supports the roll. A cotter pin 62 interconnects the arms and bears the weight of the roll member. A spring 63 surrounds the pin and urges the arm, which might normally be permitted to play within the bifurcated portion of the pin, against the cotter pin. A similarly mounted roll 64 supported by rod 65 which is pivoted in the slidable member 51, is adapted to swing downwardly to engage roll member 56, but avoids contact with its shouldered portion 57. It likewise is resiliently mounted and is raised and lowered in the manner which characterizes roll 58.

In the modification that is illustrated in Fig. 4 and which may be employed advantageously, when applying rubber tissue to non-extensible beads, the roller members 54 and 56 at the opposite ends of the channel are unnecessary. Also top roll 64 which engages the roll 56 of the embodiment illustrated in Fig. 2 is omitted. In their place is substituted a contact surface 67, as for example a soap stone base, which resists the movement of the rubber strip sufficiently, as it passes thereover, to tension the gum before it is stitched to the skirt of the bead by the roll 58.

Below and in advance of the discharge end of the channel, there is bracketed to the frame a beveled rotatable disc 68. The lower edge of the disc is protected by a metallic guard 69, that is likewise joined to the frame. On the receding side of the pulley and likewise bracketed to the frame is a rotatable roller 70, whose construction is similar to its cooperative roller 34 mounted on the clamping arm.

To gum strip an inextensible bead, the operator positions the flipped bead against the flange 24 with its skirt 14 overlapping the same and extending between the disc 68 and roller 58. The roll 70 is sufficiently near the bead to engage the skirt and cause it to be inclined vertically. Subsequently, a strip of rubber of sufficient length to surround the bead is severed from its source of supply and one end thereof is attached about the edge of skirt proximate the exit end of the channel 53. The remainder is lowered within the channel and the excess is permitted to hang loosely therefrom. The handle 44 of the bell crank is then turned in the direction indicated by the arrow until the lug 43 engages the link 38. The guide rolls 32 will have engaged the bead and clamped it securely against the flange. At the same time the roll 34 engages its parallel cooperative roll 70, which tilts the skirt radially from its normal position in which it is substantially parallel to the surface of the drum. The roll members 58 and 64 will have likewise been lowered; the former rests on the skirt of the bead while it is in engagement with the disc 68 and the latter engages the strip of rubber as it passes over the shouldered roll 56.

As the drum is caused to rotate, the rubber tissue is drawn over the roll 54 and through the channel 53 where it is aligned with the engaging rolls 56 and 64 before it is stitched to the skirt of the bead. The roll 58, which engages both the bead and shouldered portion of the roll 56, drives the latter. It will be noted, however, that the peripheral speed of that portion of the roll 56, which comes in contact with the aligned strip, is less than that of the roll 58 which stitches the strip to the exposed side of the skirt. The strip is stretched, therefore, an amount that is proportional to the difference between the peripheral velocities of the respective surfaces which come in contact with the strip. In an effort to relieve the strain to which the outer edge of the tensioned band is subjected, after it has been stitched to the side of the flipper, it curls about the edge of the skirt. This action is augmented by the rolls 34 and 70 between which the skirt passes while it is inclined radially outwardly; at the same time the curled strip is stitched in its final position by the rolls. After the rubber has been applied to the entire circumference, the rotation of the drum is interrupted, the clamping arm 44 raised by turning the handle and the bead product removed, after which the cycle may be repeated.

Certain adjustments on the machine will be apparent from the drawings, such for example as the alignment of the guide member 48 with respect to the drum 23. This has a direct bearing upon the width of that portion of the strip of rubber which curls about the edge of the skirt. Also an adjustment may be found necessary in the case of the roll 26, which is employed with clincher beads. It is raised or lowered according to their diameters.

Although I have described but a single embodiment of the principles of my invention, together with a modification of a few of its elements, it will be apparent to those skilled in the art that the principles are susceptible to many modifications without departing from the scope of the invention and I desire therefore, that it be limited only in accordance with the prior art and the appended claims.

What I claim is:

1. In a machine for applying rubber strips to tire beads, means for stitching a strip of rubber to one side of the bead so as to leave an edge of the rubber projecting beyond the side of the bead, and additional means for stretching the projecting edge to cause it to curl and contact with the adjacent side of the bead.

2. A machine for applying an unvulcanized rubber strip to flipped beads comprising means for rotating the bead, means for stitching a strip of rubber to the flipper strip of a bead whereby the rubber overlaps the edge thereof and means for stitching the margin about the edge of the flipper.

3. A machine for applying a strip of unvulcanized rubber to flipped beads comprising means for rotating a bead, means for stitching a strip of rubber to the skirt of the bead, whereby the rubber overlaps the edge thereof, and means for turning the excess about the edge of the flipper.

4. A machine for applying a strip of unvulcanized rubber to flipped beads comprising means for rotating a bead, means for stitching the strip of rubber to the skirt of the bead whereby the rubber overlaps the edge thereof and means for tensioning the edge of the rubber strip thereby causing it to curl about the edge of the skirt.

5. A machine for applying a strip of raw rubber to flipped beads comprising means for applying a strip of rubber to the skirt of the bead whereby it overlaps the edge thereof and means for tensioning the rubber thereby causing it to curl about the edge of the skirt.

6. A machine for applying a strip of raw rubber to flipped beads comprising means for stitching a strip of rubber to the skirt of a bead whereby the rubber overlaps the edge thereof, a roller member adapted to increase the apparent diameter of the edge of the flipper thereby causing the free edge of the rubber to curl about the edge of the skirt.

7. A machine for applying a strip of unvulcanized rubber to flipped beads comprising means for rotating the bead, means for tensioning the strip, means for stitching a strip of rubber to the skirt of the bead whereby the rubber overlaps the edge thereof, a roller member adapted to increase the apparent diameter of the skirt thereby causing the rubber to curl about the edge and means for stitching it in its final position.

8. A machine for applying a strip of raw rubber to flipped beads comprising a power driven drum for rotating the bead, means for stitching a strip of rubber to the flipping strip of a bead whereby it overlaps the edge of the bead skirt, a roller member adapted to cause the rubber to curl about the edge, and a second roller in cooperative relation with the first mentioned roller adapted to stitch the rubber in its final position.

9. A machine for applying unvulcanized rubber strips to flipped beads comprising a power driven drum for rotating the bead having a ridged portion about its outer periphery, means for clamping a bead thereagainst, a guide for aligning a strip of rubber to overlap the skirt of the bead, means for tensioning the strip, a roll for stitching the rubber strip to the bead, a set of rolls substantially parallel to the axis of the drum for tensioning the edge of the strip, thereby causing it to curl about the edge of the skirt, and means for subsequently stitching it in its final position.

10. A machine for applying rubber strips to beads having skirts comprising a power driven drum for rotating the bead, a roller member in engagement with the skirt of the bead adapted to stitch a strip of rubber aligned to overlap the skirt of the bead and a set of cooperative rolls adapted to tension the skirt portion by increasing its apparent diameter, thereby causing the rubber to curl about the edge portion.

11. A machine for applying strips of unvulcanized rubber to flipped beads comprising a drum adapted to receive and rotate a bead, means for clamping the bead in engagement therewith, a guide member for aligning a strip of rubber to overlap the skirt of the bead and a set of parallel roller members for causing the free margin of the rubber to curl about the edge of the skirt, and stitching the same in its final position.

12. A machine for applying strips of rubber tissue to beads having skirts comprising a drum adapted to receive and rotate a bead, co-operative members for clamping the bead in engagement therewith, a rotatable member for supplying a strip of rubber, a roll for stitching the aligned strip of rubber to overlap the skirt portion of the bead, and a set of engaging rolls adapted to stitch the free marginal portion of the strip about the edge of the skirt.

13. A machine for applying rubber strips to flipped beads comprising a drum adapted to receive and rotate a bead, cooperative members for clamping the bead in engagement therewith, a rotatable member for supplying a strip of rubber under slight tension, a roll for stitching the aligned strip of rubber to overlap the skirt portion of the bead, and a set of parallel roll members between which the skirt finally passes.

14. A machine for applying rubber strips to flipped beads comprising a drum adapted to receive and rotate a bead, cooperative members for clamping the bead in engagement therewith, a rotatable member, a guide juxtapositioned thereto for supplying a strip of rubber to the bead under tension, a roll for stitching the aligned strip of slightly tensioned rubber to overlap the skirt of the bead portion and a set of parallel roll members positioned to increase the apparent diameter of the skirt thereby tensioning the edge and curling the free marginal portion of the rubber strip about the fabric before passing between the members.

15. In a machine for applying rubber strips to flipped beads including means for rotating a bead, means for clamping the same in position for rotation and means for stitching the rubber about the edge of the bead skirt, a device for supplying a strip of unvulcanized rubber to the edge of the bead comprising means for aligning the strip and means for stitching the same to the skirt.

16. In a machine for applying a rubber tissue to flipped beads including means for rotating a bead, means for clamping the same in position for rotation and means for stitching the rubber about the edge of the bead skirt, a device for supplying a strip of raw rubber to the edge of the bead comprising an adjustable aligning member for the strip and a roller member for stitching the strip while under slight tension to the skirt of the bead.

17. In a machine for applying rubber strips to flipped beads including means for rotating a bead, means for clamping the same in position for rotation and means for stitching the rubber about the edge of the bead skirt, a device for supplying a strip of unvulcanized rubber to the edge of the bead comprising an adjustable channel for aligning the strip, a roll member for stitching the strip to the bead and means for imparting a slight tension to the strip before stitching the same.

18. In a machine for applying rubber strips to flipped beads including means for rotating a bead, means for clamping the same in position for rotation and means for stitching the rubber about the edge of the bead skirt, a device for supplying a strip of unvulcanized rubber to the edge of the bead comprising an adjustable channel for aligning the strip, a roll member for stitching the strip to the bead and a feeding roll for supplying the rubber at a lower rate of speed than the peripheral speed of the bead.

19. In a machine for applying rubber strips to flipped beads including means for rotating a bead, means for clamping the same in position for rotation and means for stitching the rubber about the edge of the bead skirt, a device for supplying a strip of unvulcanized rubber to the edge of the bead comprising an adjustable channel for aligning the strip, a roller member for stitching the strip to the bead and a feeding roll for supplying a strip of rubber at a lower linear speed than the bead and the stitcher roll in contact therewith.

20. In a machine for applying a strip of rubber to a flipped bead including means for rotating the bead, means for clamping the same in position for rotation and means for stitching the rubber strip to the edge of the flipped bead, means for curling and stitching the strip about the edge of the bead comprising a set of rolls parallel to each other and substantially parallel to the axis of the bead.

21. A method of applying a strip of rubber to a body of substantially prismatic cross-section, that comprises stitching the strip to one face of the body so that one edge projects from the body, and then applying longitudinal tension to the projecting edge of the strip so as to cause it to curl about the edge of the body and contact with adjacent face of said body.

22. A method of applying a strip of rubber to the edge of a flipped bead that comprises stitching the strip to overlap the flipper strip of the bead, increasing the tension on the free side of the rubber strip thereby causing it to curl about the flipper.

23. A method of applying a strip of rubber to the edge of a flipped bead that comprises stitching the strip to overlap the flipper strip of the bead, increasing the apparent diameter of the skirt portion of the bead, thereby causing the rubber to curl about the edge of the skirt.

24. The method of applying a strip of rubber to the edge of a flipped bead that comprises stitching a strip of slightly tensioned rubber to overlap the edge of the flipper strip of the bead, thereafter causing the free edge of the rubber to curl about the skirt by increasing its tension and subsequently stitching the edge portion of the skirt.

In witness whereof, I have hereunto signed my name.

JESS A. SHIVELY.